(12) United States Patent
Gatenholm et al.

(10) Patent No.: US 7,427,643 B2
(45) Date of Patent: Sep. 23, 2008

(54) POLYMERIC FILM OR COATING COMPRISING HEMICELLULOSE

(75) Inventors: Paul Gatenholm, Kullavik (SE); Aase Bodin, Molndal (SE); Maria Gröndahl, Göteborg (SE); Sofia Dammstrom, Gothenburg (SE); Lisa Eriksson, Gothenburg (SE)

(73) Assignee: Xylophane Aktiebolag, Gothenburg (SE)

( * ) Notice: Subject to any disclaimer, the term of this patent is extended or adjusted under 35 U.S.C. 154(b) by 214 days.

(21) Appl. No.: 10/548,799

(22) PCT Filed: Mar. 18, 2004

(86) PCT No.: PCT/SE2004/000413

§ 371 (c)(1),
(2), (4) Date: Sep. 12, 2005

(87) PCT Pub. No.: WO2004/083286

PCT Pub. Date: Sep. 30, 2004

(65) Prior Publication Data

US 2006/0173104 A1 Aug. 3, 2006

(30) Foreign Application Priority Data

Mar. 21, 2003 (SE) .................... 0300801

(51) Int. Cl.
*C08L 3/00* (2006.01)
*C08L 89/00* (2006.01)
*D21H 19/54* (2006.01)

(52) U.S. Cl. ........................................ 524/47
(58) Field of Classification Search .............. 524/27
See application file for complete search history.

(56) References Cited

U.S. PATENT DOCUMENTS

| | | | | | |
|---|---|---|---|---|---|
| 4,419,316 A | * | 12/1983 | Schweiger | .................. | 264/184 |
| 4,506,044 A | * | 3/1985 | Cox et al. | ...................... | 524/27 |
| 4,564,649 A | * | 1/1986 | Hume et al. | .................. | 524/13 |
| 4,725,657 A | * | 2/1988 | Shibanai | ..................... | 424/486 |
| 5,095,054 A | * | 3/1992 | Lay et al. | ...................... | 524/47 |
| 5,179,021 A | * | 1/1993 | du Manoir et al. | .......... | 435/278 |
| 5,468,287 A | | 11/1995 | Hattori | | |
| 5,646,206 A | * | 7/1997 | Coffin et al. | ................. | 524/27 |
| 5,800,602 A | * | 9/1998 | Baur et al. | ............... | 106/162.2 |
| 5,981,790 A | | 11/1999 | Cotting et al. | | |
| 6,004,616 A | | 12/1999 | Maeda | | |
| 6,057,438 A | * | 5/2000 | Hyatt et al. | ................. | 536/127 |
| 6,261,578 B1 | * | 7/2001 | Dupuis | ....................... | 424/401 |
| 6,362,256 B2 | * | 3/2002 | Willett et al. | ................ | 524/13 |
| 6,395,204 B1 | * | 5/2002 | Neogi et al. | ............... | 264/37.1 |
| 6,558,728 B1 | * | 5/2003 | Poulsen et al. | .............. | 426/549 |
| 6,878,760 B2 | * | 4/2005 | Corvasce et al. | .............. | 524/47 |
| 2001/0020091 A1 | * | 9/2001 | Buchanan et al. | ........... | 536/123 |
| 2002/0107303 A1 | * | 8/2002 | Miyabashi et al. | .......... | 523/160 |
| 2002/0188041 A1 | * | 12/2002 | Bond et al. | .................... | 524/47 |
| 2003/0021865 A1 | * | 1/2003 | Maeda et al. | ................... | 426/5 |
| 2003/0171458 A1 | * | 9/2003 | Buchanan et al. | .............. | 524/32 |
| 2004/0129395 A1 | * | 7/2004 | Rehders et al. | ............. | 162/111 |
| 2006/0051812 A1 | * | 3/2006 | Helin et al. | ................... | 435/7.1 |
| 2006/0235115 A1 | * | 10/2006 | Wiemer et al. | ................ | 524/27 |
| 2007/0179218 A1 | * | 8/2007 | Brake et al. | .................... | 524/27 |

FOREIGN PATENT DOCUMENTS

| | | | |
|---|---|---|---|
| EP | 0400484 A1 | | 12/1990 |
| EP | 0612789 A1 | | 8/1994 |
| EP | 1-95977 A1 | | 5/2001 |
| EP | 1095977 A1 | | 5/2001 |
| FR | 2730236 A1 | | 8/1996 |
| JP | 43 31246 A | | 11/1992 |
| JP | 4331246 A | | 11/1992 |
| WO | 0206411 A1 | | 1/2002 |
| WO | WO 0206411 A1 | | 1/2002 |
| WO | WO0279332 A1 | * | 10/2002 |
| WO | WO0168713 A2 | * | 9/2007 |

OTHER PUBLICATIONS

Indian Office Action issued in Indian counterpart application on Dec. 9, 2006.
Rindlav-Westling, Å.; Stading, M.; Hermansson, A.-M.; Gatenholm, P. Structure, mechanical and barrier properties of amylose and amylopectin films. Carbohydrate Polymers (1998), 36, 217-224.
McHugh, T. H.; Krochta, J. M. Permeability properties of edible films. In Edible Coatings and Films to Improve Food Quality; Krochta, J. M.; Baldwin, E. A.; Nisperos-Carriedo, M. O., Eds.; Technomic Publishing Company: Lancaster (1994); pp. 139-187.

(Continued)

*Primary Examiner*—Mark Eashoo
*Assistant Examiner*—Liam J Heincer
(74) *Attorney, Agent, or Firm*—Jeffrey S. Melcher; Manelli Denison & Selter, PLLC

(57) ABSTRACT

A film-forming composition and a polymeric film or coating comprising hemicellulose, having a molecular weight of less than 50 000 g/mol, and at least one component selected from the group consisting of plasticizers, cellulose and a synthetic oligomer or polymer is disclosed. The use of said film or coating as an oxygen barrier is also disclosed. Further, a method for the manufacture of said polymeric film or coating is disclosed, as well as a method for improving the film-forming properties of hemicellulose having a molecular weight of less than 50 000 g/mol.

27 Claims, No Drawings

OTHER PUBLICATIONS p. 137 in Foods and Packaging Materials—Chemical Interactions, 1995.

p. 30 in Bain & Giles, 2000.

p. 23 in Piringer & Baner, 2000.

p. 25 in Robertsson, 2006.

Bain, D. R., & Giles, G. A. (Red.). (2000). Materials and Development of Plastic Packaging for the Consumer Market. England: Sheffield Academic Press.

Ackermann, P., Jägerstad, M., & Ohlsson, T. (Eds.). (1995). Foods and Packaging Materials—Chemical Interactions. Lund: The Royal Society of Chemistry.

Piringer, O. -G., & Baner, A. L. (Red.). (2000). Plastic Packaging Materials for Food—barrier function, mass transport, qualtity assurance, and legislation. Germany: Wiley-vch Verlag.

Robertsson, G. L. (2006). Food Packaging—Principles and Practice (Second Edition uppl.). CRC Press.

"An industry rule-of-thumb is that a material is considered a "high oxygen barrier" if its OTR is less than 1 cc/100 in2/24hr (15.5 cc/m2/24 hr)." http://www.polyprint.com/faq_otr.htm.

"Certain polymers are particularly useful in restricting entry of oxygen into packages. Such polymers, because they are highly impermeable to oxygen, are called high barrier polymers. They typically have an oxygen transmission rate (OTR) at 20° C of less than 15 cc/m2-day atm." http://www.intracen.org/Tdc/Export%20packaging/EPN/English/epn38e.pdf.

p. 4-5: http://akseli.tekes.fi/opencms/opencms/OhjelmaPortaali/ohjelmat/Pakkaus/fi/Dokumenttiarkisto/Viestinta_ja_aktivointi/Seminaarit/seminaari_6.10.2004/SIP_Rolig.pdf.

\* cited by examiner

POLYMERIC FILM OR COATING COMPRISING HEMICELLULOSE

TECHNICAL FIELD

The present invention relates to a film-forming composition and a polymeric film or coating comprising hemicellulose. It also relates to the use of said film or coating as an oxygen barrier. Further, the invention relates to a method for the manufacture of a polymeric film or coating comprising hemicellulose, as well as to a method for improving the film-forming properties of hemicellulose.

BACKGROUND OF THE INVENTION

The majority of plastic materials for packaging are today based on petroleum. However the fossil resources on the earth are limited. Incineration results in an increase of the greenhouse effect and furthermore these materials are in general not degradable. A sustainable development in the future requires a conversion to the use of renewable raw materials.

In many food packaging applications it is important to protect the food from oxygen as oxidation of aroma compounds, due to the ingress of oxygen, reduces the quality and the flavour of the product. This can be done by using a barrier material, which has low permeability to oxygen. Furthermore, it is desirable that the material is flexible, mechanically resistant, transparent and of low cost.

EVOH (Ethylene vinyl alcohol) and PVOH (polyvinyl alcohol) are examples of synthetic polymers exhibiting good barrier properties.

Lately, research has been made to obtain oxygen barriers based on renewable raw materials. Films based on proteins or polysaccharides, such as starch and cellulose, have shown to be good barriers for oxygen. One drawback of these materials is their sensitivity to water. When the surrounding relative humidity is increased the oxygen permeability increases as well.

Hemicelluloses are polysaccharides that are biosynthesized in the majority of plants, where they act as a matrix material present between the cellulose microfibrils and as a linkage between lignin and cellulose. Hemicelluloses have been commercially used as sweetening agents, thickeners and emulsifiers in food. So far the non-food utilisation of hemicelluloses has been very limited. For example they have not yet been used commercially for the preparation of polymeric materials.

The properties of films based on hemicellulose have so far been very seldom studied. In general, hemicellulose exhibit poor film-forming properties resulting in either fragmented or very brittle films. However, the film-forming properties vary with the structure of the hemicellulose, which in turn is varying depending on its natural source and the extraction method. To be appropriate as a barrier material the film-forming properties have to be improved.

In WO 02/06411, the use of heteroxylans for the preparation of a film-forming composition containing a plant protectant is disclosed. The aim of WO 02/06411 is to provide a composition which is useful for applying a plant protectant to seeds or agricultural products. Thus, the purpose of incorporating heteroxylans is to obtain a film-forming composition for the application of the plant protectant.

The molecular weight of the heteroxylans used in WO 02/06411 ranges from 100 000 to 250 000 g/mol. The use of high molecular weight hemicellulose produces compositions having relatively high viscosities, which makes the compositions difficult to handle practically.

In U.S. Pat. No 6,004,616 a biodegradable film is obtained by subjecting water-soluble hemicellulose to film-formation. The hemicellulose used has an average molecular weight in the range of 50 000 to 1 000 000, preferably in the range of 100 000 to 400 000. Again, the high molecular weights present handling problems due to high viscosity.

Further, the thickness of the films described in U.S. Pat. No 6,004,616 is 0,1 mm in dried state. Thus, the films are relatively thick, which requires a lot of material to be consumed in the manufacture of the films. As a consequence thereof, the cost of materials will be very high.

There is thus a need for biodegradable film-forming compositions which overcome the abovementioned problems, and which presents the desired property of having low oxygen permeability.

SUMMARY OF THE INVENTION

Therefore, an object of the present invention is to provide flexible films or coatings based on hemicellulose having a molecular weight of 50 000 g/mol or less.

Another object is to provide a film-forming composition and films or coatings based on hemicellulose having a molecular weight of 50 000 g/mol or less, which can be used as oxygen barriers.

These objects are achieved by mixing hemicellulose having a molecular weight of 50 000 g/mol or less with at least one component selected from the group consisting of plasticizers, cellulose and an oligomer or polymer, and forming a film or coating thereof. The polymeric film or coating thereby formed can be used as an oxygen barrier.

The use of hemicellulose having a molecular weight of 50 000 or less is advantageous because it allows for a greater number of hemicellulose raw material to be used for the preparation of films or coatings. Further, there are more extraction methods available for extracting molecules having lower molecular weights.

One further advantage with the present invention is the excellent oxygen barrier properties of the films or coatings produced. The measured oxygen permeability was in the same range as for the commercially used barrier EVOH and for films of starch.

Another advantage of the present invention is that the mechanical properties of the films or coatings produced can be controlled by addition of various amounts or types of plasticizers, cellulose or blending with other polymers or oligomers.

A further advantage is that the raw material in the present invention is renewable and can be extracted from biomass.

Materials based on biosynthesized polymers have several environmental advantages. After their use, these materials do not give rise to a net increase of carbon dioxide in the atmosphere and in addition most of them are biodegradable and as such can be disposed of by composting.

DETAILED DESCRIPTION OF THE INVENTION

In the research work leading to the present invention it was shown that coherent films based on hemicellulose, in particular pentosan-rich polysaccharides, e.g. xylans, exhibit excellent oxygen barrier properties. It has surprisingly been found that hemicelluloses having a molecular weight of less than 50 000 g/mol may be used for the purpose of preparing films which may be used as oxygen barriers.

Hemicelluloses are substituted/branched polymers of low to high molecular weight. They consist of different sugar units arranged in different portions and with different substituents. Pentosan-rich polysaccharides have a prevalent pentose content and constitute the largest group of hemicelluloses.

As used herein a "pentosan-rich polysaccharide" refers to a polysaccharide having a pentosan content of at least 20% by weight, and a xylose content of at least 20% by weight; for example, the polysaccharide has a pentosan content of 40% to 80% by weight, and a xylose content of 40% to 75% by weight.

Pentosan-rich polysaccharides, in particular xylans, are the most preferred compounds for use according to the present invention, since they are not so sensitive to humidity. However, other kinds of hemicelluloses may be used according to the invention, e.g. glucomannan, galactoglucomannan or arabinogalactan.

Hemicellulose, in particular xylans, for use according to the invention have a molecular weight of less than 50 000 g/mol. Advantageously, the hemicellulose has a molecular weight greater than 8 000 g/mol. For example, the hemicellulose may have a molecular weight in the range of 8 000-50 000 g/mol, 8 000-48 000 g/mol or 8 000-45 000 g/mol.

Other examples of molecular weights of the hemicellulose are 8 000-15 000 g/mol, 8 000-14 000 g/mol, 8 000-13 000 g/mol, 8 000-12 000 g/mol, or in particular 8 000-11 000 g/mol. The use of low molecular weights is an advantage as hemicellulose from many sources can be used and the extraction procedure is simplified.

Other examples of molecular weights of the hemicellulose are 15 000-50 000 g/mol, 20 000-50 000 g/mol, 15 000-48 000 g/mol, 20 000-48 000 g/mol, 15 000-45 000 g/mol, or in particular 20 000-45 000 g/mol or 20 000-40 000 g/mol. The use of somewhat higher molecular weights facilitates film formation. If even higher molecular weights are used, high viscosity can complicate the use of the hemicellulose to produce a film or coating and the extraction methods are considerably restricted.

Xylans are present in biomass such as wood, cereals, grass and herbs and they are considered to be the second most abundant biopolymer in the plant kingdom. To separate xylans from other components in various sources of biomass, extraction with water and aqueous alkali can be used. Xylans are also commercially available from sources as Sigma Chemical Company.

Xylans may be divided into the sub-groups of heteroxylans and homoxylans. The chemical structure of homoxylans and heteroxylans differs. Homoxylans have a backbone of xylose residues and have some glucuronic acid or 4-O-methyl-glucuronic acid substituents. Heteroxylans also have a backbone of xylose residues, but are in contrast to homoxylans extensively substituted not only with glucuronic acid or 4-O-methyl-glucuronic acid substituents but also with arabinose residues. An advantage of homoxylans compared to heteroxylans is that homoxylans crystallize to a higher extent. Crystallinity both decreases gas permeability and moisture sensitivity.

An example of homoxylan which can be used according to the invention is glucuronoxylan.

Examples of heteroxylans which can be used according to the invention are arabinoxylan, glucuronoarabinoxylan and arabinoglucuronoxylan.

Xylans from any biomass or commercial source may be used to produce the films or coatings in the present invention. To obtain a coherent film, film-formation is a necessary recruitment.

A film-forming composition of hemicellulose, in particular xylans, may be achieved by various strategies. One way to do this is to add low molecular weight plasticizers. Another way to prepare coherent films is to add finely divided cellulose. A third procedure to obtain films is by blending xylan with other oligomers or polymers. An additional strategy to achieve better film-forming properties is to mix hemicelluloses of different molecular weights or structures. It is also possible to use a combination of one or more of the before mentioned strategies.

The films or coatings may be prepared by casting of an aqueous solution or dispersion of the pentosane-rich polysaccharide. Although other solvents could be used as solvents in the present invention, water is the most preferred solvent.

As used herein, the expression "film" refers to a separate sheet, which can be used e.g. for the packaging of food or pharmaceuticals.

As used herein, the expression "coating" refers to a covering that can be integrated in e.g. a carton in order to provide an oxygen barrier layer.

The film or coating according to the invention may have a thickness of 100 micrometers or less. In particular, the film or coating may have a thickness of 50 micrometers or less, or more specifically the film or coating may have a thickness of 10 micrometers or less.

It has surprisingly been found that very thin films may be made according to the present invention. For example, the film or coating may have a thickness of 2 micrometers or 1 micrometer and still present the desired properties.

The expression "plasticizer" as used herein relates to a substance of low molecular weight, which increases the flexibility of the material. Examples of plasticizers that may be used are water, sugars such as glycerol, xylitol, sorbitol and maltitol, ethylene glycol, propylene glycol, butanediol, glycerine and urea.

Suitably, the content of plasticizer is in the range of 1-60% by dry weight, e.g. in the range of 20-50% by dry weight.

The cellulose added to improve the film-forming properties can originate from any biomass such as cotton, wood and agriculture residues or commercial source or be produced by bacteria. Preferably the cellulose is finely divided. Suitably, the content of finely divided cellulose is in the range of 1-90% by dry weight, e.g. in the range of 50-75% by dry weight.

The polymer or oligomer added can be of any type. For example, the polymer or oligomer added to obtain a coherent film is polyvinyl alcohol of various molecular weights. Suitably, the content of polymer or oligomer is in the range of 1-90% by dry weight, e.g. in the range of 20-75% by dry weight.

By the expression "oxygen barrier" used throughout this application is meant a material, which has low permeability to oxygen. The oxygen barrier can be used to protect a substance, e.g. food or medicals, from exposure to oxygen.

The polymeric films or coatings according to the present invention can be used as an oxygen barrier in food packaging or pharmaceutical packaging.

In addition, the films or coatings of the present invention can be used as an oxygen barrier layer on e.g. cartons and paper, possibly in combination with a water resistant material.

The films or coatings of the present invention can also be used for drug delivery, edible films and other polymeric applications.

EXAMPLES

Example 1

This example illustrates the production of a film based on xylan, where the film-forming properties have been improved using the low molecular plasticizer xylitol. A series of films containing 20%, 27.5%, 35%, 42.5% and 50% of added xylitol (dry weight) were investigated. A mixture of xylitol and glucoronoxylan from aspen with a total weight 1 g was solubilized in 35 ml of water in 95° C. for 15 minutes. The solution was then poured onto polystyrene Petri dishes with a diameter of 14 cm. After drying in 23° C. and 50% RH for two to three days, transparent and more or less flexible films were obtained.

The molar mass of the glucuronoxylan was measured using size exclusion chromatography with 0.05 M LiBr in DMSO:water (90:10) as the mobile phase. The following PSS (Polymer Standard Service) column set was used: GRAM 30, 100, 3000 (8×300 mm) and guard column (8×50 mm). The flow rate was 0.4 ml/min at 60 ° C., resulting in a system pressure of 58 bar. The samples were dissolved in the eluent in a shaker for 24 hours at room temperature and filtered using regenerated cellulose membranes (0.45 μm). An RI detector (Shodex RI-71), a two-angle laser light scattering detector (Precision detectors PD 2000) and a viscosimetric detector (Viscotek H502) were used for detection. The data were collected and calculated using WINGPC 6.0 software of PSS. Molar mass data were calculated from the viscosity and RI signals by universal calibration using pullulan standards (PSS). The obtained molar mass was 15 000 g/mol.

The mechanical properties of the films were measured using a tensile testing machine (Lloyd L2000R) with a load cell of 100 N capacity. The samples were cut into dog bone-shaped strips with a width of 1.5 cm. The thickness of the samples, measured with a micrometer, was 30-40 μm. The initial distance between the grips was 20 mm and the separation rate of the grips constant at 5 mm/min (Examples 1, 2 and 7) or 10 mm/min (Example 4). At least five replicates from each material were tested. For each sample the stress-strain curve was recorded and stress at break and strain at break were calculated.

The oxygen permeability of the films was measured with a Mocon oxtran 2/20 equipment using a coulometric oxygen sensor. The area of the sample was 5 cm$^2$ and the analysis was performed in 50% RH. The oxygen permeability was calculated from the oxygen transmission and the measured thickness of the films and is presented in units of $(cm^3\ \mu m)/(m^2\ d\ kPa)$, where d=24 h.

The crystallinity of the films was investigated using wide angle x-ray scattering (WAXS). Films were milled to a fine powder using liquid nitrogen and the samples were investigated with a Siemens D5000 diffractometer. CuKα radiation was used with a wavelength of 1.54 Å. 2θ was varied between 5° and 30°.

| Content of xylitol % | Stress at break MPa | Strain at break % | O$_2$-permeability $(cm^3\ \mu m)/(m^2\ d\ kPa)$ |
|---|---|---|---|
| 20 | 39.4 | 2.1 | — |
| 27.5 | 15.2 | 2.5 | — |
| 35 | 10.6 | 5.3 | 1.10 |
| 42.5 | 4.8 | 7.8 | — |
| 50 | 3.0 | 8.0 | — |

The flexibility increased with increasing amount of added plasticizer. All films were semi-crystalline and the degree of crystalliniy was little affected by the addition of xylitol.

Example 2

This example illustrates the production of a film based on xylan, where the film-forming properties have been improved using the low molecular plasticizer sorbitol. The same procedure as in Example 1 was used except that sorbitol was used as plasticizer instead of xylitol and the series included three levels of plasticizers, namely 20%, 35% and 50% was investigated.

| Content of sorbitol % | Stress at break MPa | Strain at break % | O$_2$-permeability $(cm^3\ \mu m)/(m^2\ d\ kPa)$ |
|---|---|---|---|
| 20 | 35.4 | 2.0 | — |
| 35 | 13.5 | 5.8 | 0.21 |
| 50 | 3.9 | 10.4 | — |

The flexibility of the films increased with increasing amount of sorbitol. The addition of sorbitol had only a minor effect on the relative crystallinity of the films.

Example 3

This example illustrates the production of films made from xylan and polyvinyl alcohol. The same procedure as in Example 1 was used but 0.75 g of polyvinyl alcohol (mw 20 000) was mixed with 0.25 g of xylan. Flexible films were formed. The measured oxygen permeability of the films was 0.18 $(cm^3\ \mu m)/(m^2\ d\ kPa)$.

Example 4

This example illustrates the production of films made from xylan and finely divided cellulose. 0.37 g of glucuronoxylan, solubilized in 20 ml of water in 95° C. for 15 minutes, was added to 1.13 g of bacterial cellulose homogenized in 120 ml of water. The blend was allowed to interact for 30 minutes. The resulting gel was poured onto a polystyrene Petri dish with a diameter of 14 cm, and dried at 50° C. for 48 h. After drying a flexible film was obtained. The films produced according to this method exhibited a stress at break of 102.8 MPa, a strain at break of 3.1% and an oxygen permeability of 0.225 $(cm^3\ \mu m)/(m^2\ d\ kPa)$.

Example 5

This example illustrates the production of a film based on xylan, where the xylan is obtained from an agricultural residue, such as oat spelts, barley husks or flax. 1 g of arabinoxylan was solubilized in 35 ml of water in 95° C. for 15 minutes. The solution was then poured onto a polystyrene Petri dish with a diameter of 14 cm. After drying in 23° C. and 50% RH for two to three days flexible films were obtained.

In this case, water is the preferred plasticizer. The possibility to obtain films of arabinoxylan without the addition of any other plasticizer than water is very advantageous and a surprising aspect of the present invention.

The thickness of the films, measured with a micrometer, was 30-40 μm.

The molar mass of the arabinoxylan was measured using size exclusion chromatography as described in example 1. The obtained molar mass was 34 000 g/mol.

The oxygen permeability of the films was measured with a Mocon oxtran 2/20 equipment using a coulometric oxygen sensor. The area of the sample was 5 cm$^2$ and the analysis was performed in 50% RH. The oxygen permeability, calculated from the oxygen transmission and the measured thickness of the films, was 0.19 $(cm^3\ \mu m)/(m^2\ d\ kPa)$, where d=24 h.

Example 6

This example illustrates the production of a coating based on xylan. A mixture of 0.105 g sorbitol and 0.195 g glucoronoxylan from aspen was solubilized in 30 ml of water in 95° C. for 15 minutes. The solution was then poured onto a plastic film in a polystyrene Petri dish with a diameter of 14 cm. After drying in 23° C. and 50% RH for two to three days, a coating of xylan on the plastic film was obtained.

The molar mass of the glucuronoxylan was measured using size exclusion chromatography as described in example 1. The obtained molar mass was 15 000 g/mol.

The thickness of the coating was obtained by subtracting the thickness of the plastic film from the thickness of the plastic film with the xylan coating, measured using a micrometer. The obtained thickness of the coating was 1 micrometer.

Example 7

This example illustrates the production of a film based on glucomannan, where the film-forming properties have been improved using the low molecular plasticizer sorbitol. Films without sorbitol and films containing 20% of added sorbitol (dry weight) were investigated. A mixture of sorbitol and glucomannan with a total weight of 0.2 g was solubilized in 20 ml of water in 95° C. for 15 minutes. The solution was then poured onto polystyrene Petri dishes with a diameter of 9 cm. After drying in 23° C. and 50% RH for two to three days, transparent and more or less flexible films were obtained.

The mechanical properties of the films were measured according to example 1. The thickness of the samples, measured with a micrometer, was 60-70 µm.

| Content of sorbitol % | Stress at break MPa | Strain at break % |
|---|---|---|
| 0 | 20.3 | 2.7 |
| 20 | 7.2 | 6.8 |

The flexibility increased with addition of plasticizer.

The invention claimed is:

1. An edible polymeric film formed from a composition consisting essentially of hemicellulose having a molecular weight of less than 50 000 g/mol, and a plasticizer, wherein the components are selected such that the film is edible.

2. The film according to claim 1, wherein the hemicellulose comprises at least one xylan.

3. The film according to claim 1, wherein the plasticizer comprises sorbitol.

4. A food or pharmaceutical packaging material having a polymeric film or coating formed on the packaging material, the film or coating formed from a composition consisting essentially of hemicellulose having a molecular weight of less than 50,000 g/mol and a plasticizer, wherein the film or coating providing an oxygen barrier suitable for food or pharmaceuticals.

5. The packaging material according to claim 4, wherein the hemicellulose comprises at least one xylan.

6. The packaging material according to claim 4, wherein the plasticizer comprises sorbitol.

7. A food or pharmaceutical carton having a polymeric film or coating formed on the carton, the film or coating formed from a composition consisting essentially of hemicellulose having a molecular weight of less than 50,000 g/mol and a plasticizer, wherein the film or coating providing an oxygen barrier suitable for food or pharmaceuticals.

8. The carton according to claim 7, wherein the hemicullulose comprises at least one xylan.

9. The carton according to claim 7, wherein the plasticizer comprises sorbitol.

10. A paper food or pharmaceutical packaging material having a polymeric film or coating formed thereon, the film or coating formed from a composition consisting essentially of hemicellulose having a molecular weight of less than 50,000 g/mol and a plasticizer, wherein the film or coating providing an oxygen barrier suitable for food or pharmaceuticals.

11. The packaging material according to claim 10, wherein the hemicellulose comprises at least one xylan.

12. The packaging material according to claim 10, wherein the plasticizer comprises sorbitol.

13. A method of packaging food or pharmaceutical comprising:
   providing a food or pharmaceutical packaging material;
   forming a polymeric film or coating from a composition consisting essentially of hemicellulose having a molecular weight of less than 50 000 g/mol and a plasticizer on said food or pharmaceutical packaging material to provide an oxygen barrier; and
   packaging food or pharmaceutical in the food or pharmaceutical packaging material and using the polymeric film or coating as an oxygen barrier.

14. The method according to claim 13, wherein the hemicellulose comprises at least one xylan.

15. The method according to claim 13, wherein the plasticizer comprises sorbitol.

16. A method for the manufacture of a polymeric film or a coating having an oxygen-barrier property suitable for food or pharmaceutical packaging comprising the steps of:
   providing a food or pharmaceutical packaging material; and
   forming a polymeric film or coating on the food or pharmaceutical packaging material from a composition consisting essentially of hemicellulose having a molecular weight of less than 50 000 g/mol and a plasticizer to provide the food or pharmaceutical packaging material with an oxygen barrier suitable for food or pharmaceutical packaging.

17. The method according to claim 16, wherein the hemicellulose comprises at least one xylan.

18. The method according to claim 16, wherein the plasticizer comprises sorbitol.

19. A coated pharmaceutical or food having an edible polymeric film formed from a composition consisting essentially of hemicellulose having a molecular weight of less than 50 000 g/mol and a plasticizer, wherein the components are selected such that the film is edible.

20. The coated pharmaceutical or food according to claim 19, wherein the hemicellulose comprises at least one xylan.

21. The coated pharmaceutical or food according to claim 19, wherein the plasticizer comprises sorbitol.

22. A packaging material for protecting a substance from oxygen having a polymeric film or coating formed on the packaging material, the film or coating formed from a composition consisting essentially of hemicellulose having a molecular weight of less than 50,000 g/mol and a plasticizer, wherein the film or coating providing an oxygen barrier for protecting a substance from oxygen.

23. The packaging material according to claim 22, wherein the hemicellulose comprises at least one xylan.

24. The packaging material according to claim 22, wherein the plasticizer comprises sorbitol.

25. A method of protecting a packaged substance from oxygen comprising:
  providing a packaging material;
  forming a polymeric film or coating from a composition consisting essentially of hemicellulose having a molecular weight of less than 50 000 g/mol and a plasticizer on said packaging material to provide an oxygen barrier; and
  packaging a substance in the packaging material to protect the substance from oxygen.

26. The method according to claim 25, wherein the hemicellulose comprises at least one xylan.

27. The method according to claim 25, wherein the plasticizer comprises sorbitol.

* * * * *